(12) United States Patent
Kaminagayoshi

(10) Patent No.: US 7,887,418 B2
(45) Date of Patent: Feb. 15, 2011

(54) GAMES WITH GATE CRASHER FEATURES

(75) Inventor: Takehiro Kaminagayoshi, Suginami-ku (JP)

(73) Assignee: Microsoft Corporation, Redmond, WA (US)

( * ) Notice: Subject to any disclaimer, the term of this patent is extended or adjusted under 35 U.S.C. 154(b) by 1223 days.

(21) Appl. No.: 10/822,196

(22) Filed: Apr. 9, 2004

(65) Prior Publication Data
US 2005/0227766 A1    Oct. 13, 2005

(51) Int. Cl.
A63F 9/24    (2006.01)
A63F 13/00   (2006.01)
G06F 17/00   (2006.01)
G06F 19/00   (2006.01)

(52) U.S. Cl. .................. 463/42; 463/29; 463/41; 463/1; 463/43; 725/133; 725/141

(58) Field of Classification Search ............. 463/41–43, 463/29
See application file for complete search history.

(56) References Cited

U.S. PATENT DOCUMENTS

| 2002/0103029 A1* | 8/2002 | Finlayson et al. ............. 463/42 |
| 2003/0125112 A1* | 7/2003 | Silvester ...................... 463/42 |
| 2004/0143852 A1* | 7/2004 | Meyers ....................... 725/133 |
| 2005/0096133 A1* | 5/2005 | Hoefelmeyer et al. ......... 463/40 |
| 2006/0154710 A1* | 7/2006 | Serafat ......................... 463/1 |

FOREIGN PATENT DOCUMENTS

| JP | 2000-024318 A | 1/2000 |
| JP | 2000-024319 A | 1/2000 |
| JP | 2000-350867 A | 12/2000 |
| WO | WO-9912617 A1 | 3/1999 |

OTHER PUBLICATIONS

Quake III Arena. Dec. 3, 1999. Wikipedia. "http://en.wikipedia.org/wiki/Quake_III_Arena".*
Unreal Tournament 3. Oct. 1, 2002. Wikipedia. "http://en.wikipedia.org/wiki/Unreal_Tournament_2003".*
Quake III Arena [Game Manual]. 1999. id Software. "http://jarcas.dreamhosters.com/rdocs/Quake_III_-_Manual_-_PC.pdf".*
Office Action dated Apr. 16, 2010 from Japanese Patent Application No. 2005-113396, dated Apr. 16, 2010, 4 pages, and English translation of Office Action (5 pages).

* cited by examiner

*Primary Examiner*—Paul A. D'Agostino
(74) *Attorney, Agent, or Firm*—Perkins Coie LLP

(57) ABSTRACT

Methods and systems are disclosed herein for gate crashing computer-based games. In one embodiment, a method for playing a console-based game on a host player gaming system can include receiving a request from a host player to allow gate crashing in the game. In response to the request, information related to the game can be transmitted to a server computer. The server computer can forward the information to a remote gate crasher gaming system. A gate crasher can then view the information and submit a request to crash the game and control one of the non-player characters.

40 Claims, 12 Drawing Sheets

|                                  | Yes | No | Qty |
|----------------------------------|-----|-----|-----|
| Allow game crashers?             | ✓   | ☐   | 3 ▼ |

1102 (Yes, No, Qty)

Game crasher attributes:
- Skill level: Expert ▼
- Region: World ▼
- Aliases: ▼
- Etc.: ▼

} 1104

Game crasher non-player characters:  All ✓    Limit to: ▼  } 1106

Other parameters:
- Gate crasher revival ~1108
- Serial gate crashing ~1109

( Submit ) ~1110

GAMES WITH GATE CRASHER FEATURES

TECHNICAL FIELD

The following disclosure relates generally to computer-based games and, more particularly, to computer-based games implemented by console-based gaming systems.

BACKGROUND

Home use console-based video games can be played in network-based multi-player modes or in off-line multi- and single-player modes. Network-based multi-player games allow different players at remote locations to play a game simultaneously, each controlling a particular enemy or comrade character in a common game space or simulated environment. HALO®, for example, is a multi-player game published by the Microsoft Corporation of Redmond, Wash., that has a cooperative multi-player mode where each player controls a character and the characters must cooperate to accomplish game objectives. Other known multi-player games are competitive in nature. For example, first person shooter (FPS) games such as DOOM®, QUAKE®, and UNREAL™ each have one or more multi-player modes where each player controls a character in a common game space, and each player attempts to kill (also known as "frag") the other players' characters.

In single-player games, the player often assumes the role of a main character that interacts with enemy and/or comrade characters in a common game space. The behavior of enemy and comrade characters (hereinafter "non-player characters" or "NPCs") is typically controlled by program-defined artificial intelligence (AI) or other program routines. With simple program routines, the behavior of the NPCs tends to follow stereotypic patterns that are not conducive to repeated play because the behavior becomes predictable. On the other hand, more complex AI routines that include elements of machine learning can make winning against NPCs frustratingly difficult. The goal of carefully crafting the AI or program routines is usually to produce NPC behavior that gives the illusion of playing against a living person. In practice, however, it is extremely difficult to create NPC behavior of this level and complexity. As a result, it is difficult to add elements of surprise and unpredictability to conventional single-player games. Using random number selection to vary NPC behavior and embedding one-time-only gimmicks into the NPC routines are two known methods for adding the elements of unpredictability and surprise to single-player games.

SUMMARY

The following disclosure describes game architectures that include the option of transferring non-player character (NPC) control to human players at the start of a game or during a game, introducing new and unpredictable NPC behavior in each game session. In one embodiment, a single-player game is played by a host player connected to a network, such as the Internet. During the course of play and unbeknown to the host player, the game is gate crashed by a remote player who is also connected to the network. The gate crasher can assume the role of an enemy character fighting against the host player, or a comrade character cooperating with the host player. The gate crasher alters the course of the game and behaves differently than the host player may have come to expect based on prior games in which the NPC was controlled by program-defined routines. This element of surprise adds excitement and unpredictability to what may otherwise be a repetitive and uninteresting game experience.

BRIEF DESCRIPTION OF THE DRAWINGS

FIG. 11 is a host player screen display configured in accordance with an embodiment of the invention.

DETAILED DESCRIPTION

The following disclosure describes several embodiments of systems and methods for gate crashing computer-based games. Specific details of several embodiments of the invention are described below to provide a thorough understanding of such embodiments. However, other details describing well-known structures and routines often associated with computer-based games are not set forth below to avoid unnecessarily obscuring the description of the various embodiments. Further, those of ordinary skill in the art will understand that the invention may have other embodiments that include additional elements or lack one or more of the elements described below with reference to FIGS. 1-12.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Certain embodiments of gate crashing methods and systems are described below in the context of computer-executable instructions performed by a game console or a general-purpose computer, such as a personal computer. In one embodiment, for example, these computer-executable instructions can be stored on a computer-readable medium, such as a hard disk, a floppy disk, or a CD-ROM. In other embodiments, these instructions can be stored on a server computer system and accessed via a computer network such as an intranet or the Internet. Because the basic structures and functions related to computer-executable routines and corresponding computer implementation systems are well known, they have not been shown or described in detail here to avoid unnecessarily obscuring the described embodiments.

Figure 1:
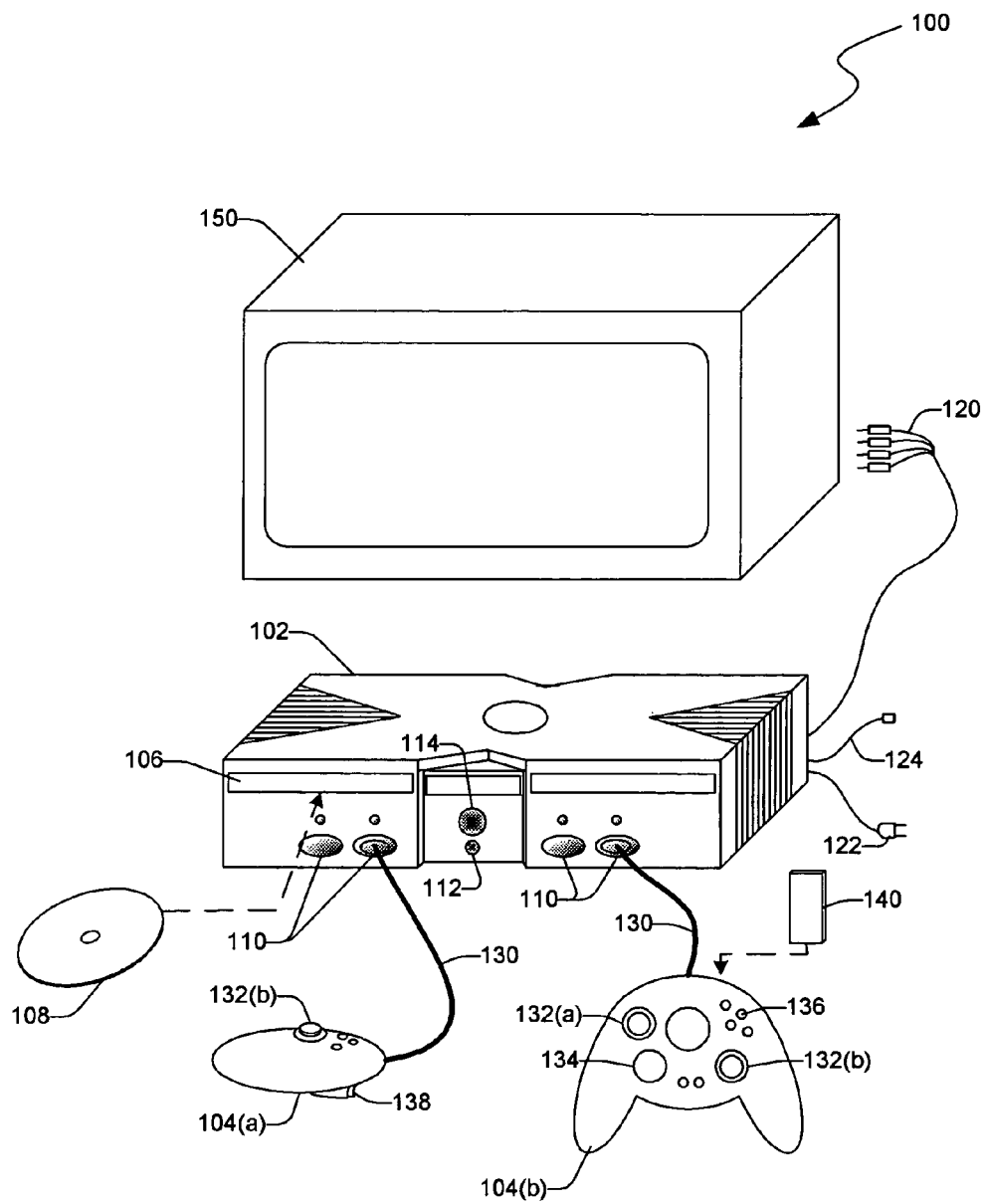
FIG. 1 is a schematic diagram illustrating a suitable gaming system on which computer games, video games and/or other electronic games can be implemented in accordance with several embodiments of the invention.

FIG. 1 is a schematic diagram illustrating a suitable gaming system 100 on which computer games, video games and/or other electronic games can be implemented in accordance with several embodiments of the invention. In one aspect of this embodiment, the gaming system 100 includes a plurality of controllers 104 (identified individually as a first controller 104a and a second controller 104b) operably connected to a game console 102. The controllers 104 can be connected to the game console 102 via a wired or wireless interface. For example, in the illustrated embodiment, the controllers 104 are universal serial bus (USB) compatible and are connected to the console 102 via serial cables 130 received in sockets 110. The controllers 104 can be equipped with a wide variety of user-interaction mechanisms. For example, in the illustrated embodiment, each controller 104 includes two thumbsticks 132a and 132b, a D-pad 134, various buttons 136, and corresponding triggers 138. The foregoing mechanisms are merely illustrative of the various types of user-interaction mechanisms that can be included with the controllers 104. Accordingly, in other embodiments, other controllers can include more or fewer such mechanisms without departing from the spirit or scope of the present disclosure.

Each of the controllers 104 can be configured to accommodate two portable memory units 140 for portable storage capability. The memory units 140 enable users to store game parameters and import them for play on other game consoles. In the illustrated embodiment, each controller 104 is configured to accommodate two memory units 140. In other embodiments, however, suitable controllers can be configured to accommodate more or fewer memory units.

The game console 102 can include a plurality of cables for connection to supporting systems. For example, the game console 102 can be operably connected to a television or display 150 via audio visual interface cables 120. In addition, a power cable 122 can provide power to the game console 102. Further, a cable or modem connector 124 can facilitate information exchange between the game console 102 and a network, such as the Internet, for broadband data transmission.

The game console 102 can be equipped with an internal hard disk drive (not shown) and a portable media drive 106. The portable media drive 106 can be configured to support various forms of portable storage media as represented by an optical storage disk 108. Examples of suitable portable storage media can include DVD and CD-ROM game disks and the like. The game console 102 can further include a power button 112 and an eject button 114. Depressing the eject button 114 alternately opens and closes a tray associated with the portable media device 106 to allow insertion and extraction of the storage disk 108.

The gaming system 100 enables players and other users to enjoy various forms of entertainment including games, music, and videos. With the different storage options available, such media can be played from the hard disk drive, the portable media drive 106, the memory units 140, or an online source. For example, the gaming system 100 is capable of playing music from a CD inserted in the portable media drive 106, from a file on the hard disk drive, or from an online streaming source. Similarly, the gaming system 100 can also play a digital audio/video game from a DVD disk inserted in the portable media drive 106, from a file on the hard disk drive (e.g., a file in Active Streaming Format), or an online streaming source.

The gaming system 100 is but one example of a suitable system for implementing embodiments of the invention. Accordingly, the methods and systems disclosed herein are not limited to implementation on the gaming system 100, but extend to numerous other general or special purpose computing systems or configurations. Examples of well-known computing systems, environments, and/or configurations that may be suitable for use with aspects of the invention include personal computers (PCs), server computers, portable and hand-held devices such as personal digital assistants (PDAs), laptop and tablet PCs, multiprocessor systems, microprocessor-based systems, set top boxes, programmable consumer electronics, network PCs, mini-computers, mainframe computers, electronic game consoles, and distributed computing environments that include one or more of the above systems or devices.

Figure 2:
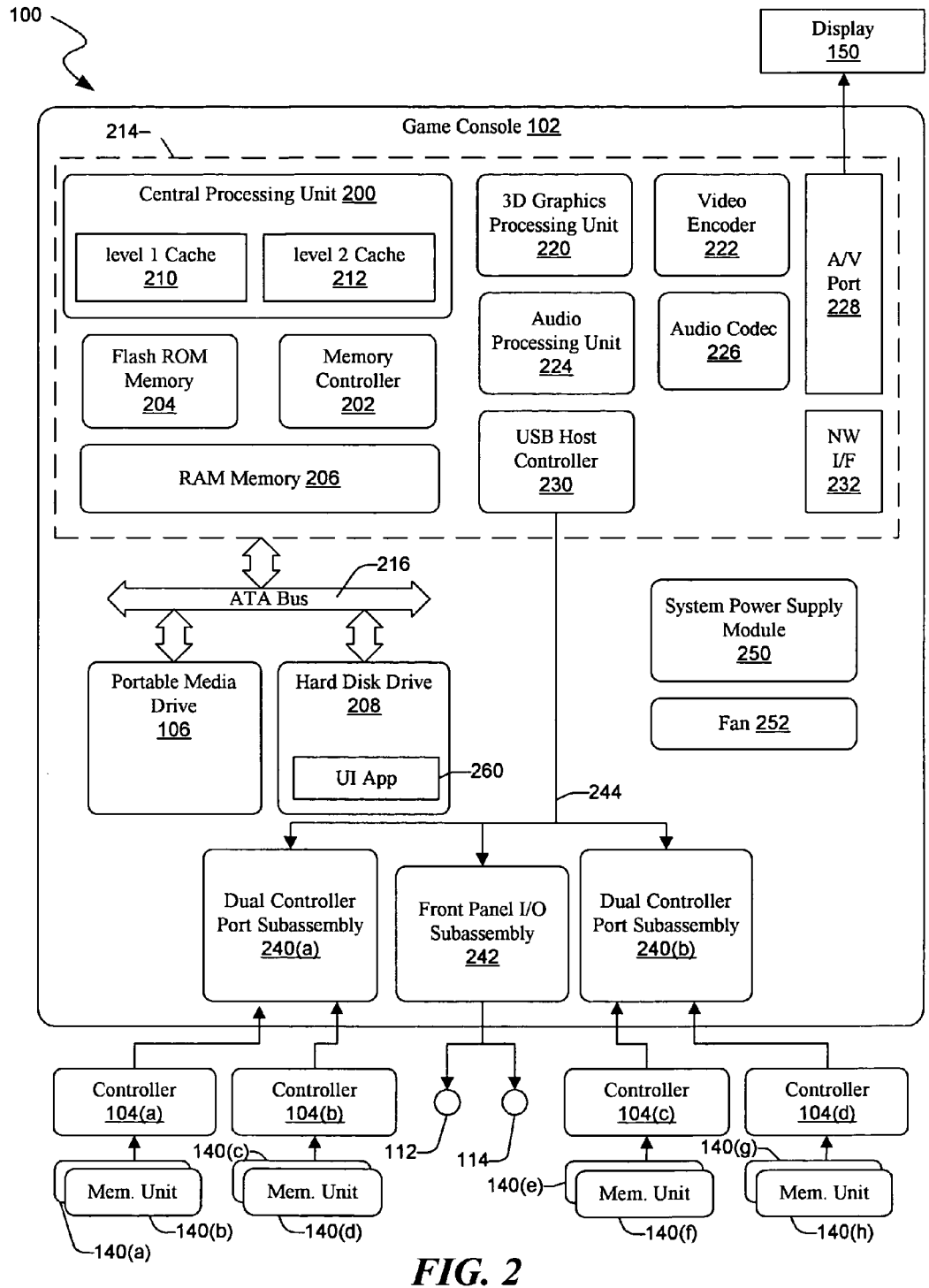
FIG. 2 is a block diagram illustrating functional components of the gaming system of FIG. 1 configured in accordance with an embodiment of the invention.

FIG. 2 is a block diagram illustrating functional components of the gaming system 100 configured in accordance with an embodiment of the invention. In one aspect of this embodiment, the game console 102 includes a central processing unit (CPU) 200 and a memory controller 202. The memory controller 202 can facilitate processor access to various types of memory. Such memory can include a flash Read Only Memory (ROM) 204, a Random Access Memory (RAM) 206, a hard disk drive 208, and the portable media drive 106. The CPU 200 can be equipped with a level one cache 210 and a level two cache 212 to temporarily store data and reduce the number of necessary memory access cycles, thereby improving processing speed and throughput. The CPU 200, the memory controller 202, and the various memory devices described above are interconnected via one or more buses, such as serial and parallel buses, memory buses, peripheral buses, and/or processor or local buses using any of a variety of bus architectures. Such architectures can include, for example, an Industry Standard Architecture (ISA), a Micro Channel Architecture (MCA), an enhanced ISA (EISA), a Video Electronics Standards Association (VESA) local bus architecture, and a Peripheral Component Interconnects (PCI) bus architecture also known as a mezzanine bus architecture.

In one embodiment, the CPU 200, memory controller 202, ROM 204, and RAM 206 can be integrated into a common module 214. In this embodiment, the ROM 204 is configured as a flash ROM that is connected to the memory controller 202 via a PCI bus and a ROM bus (neither of which is shown). The RAM 206 can be configured as a multiple Double Data Rate Synchronous Dynamic RAM (DDR SDRAM) that is independently controlled by the memory controller 202 via separate buses (not shown). The hard disk drive 208 and portable media drive 106 can be connected to the memory controller 202 via the PCI bus and an AT attachment (ATA) bus 216.

In the illustrated embodiment, a 3D graphics processing unit 220 and a video encoder 222 can form a video processing pipeline for high speed and high resolution graphics processing. Data can be carried from the graphics processing unit 220 to the video encoder 222 via a digital video bus (not shown). An audio processing unit 224 and an audio codec (coder/decoder) 226 can form a corresponding audio processing pipeline with high fidelity and stereo processing. Audio data can be carried between the audio processing unit 224 and the audio codec 226 via a communication link (not shown). The video and audio processing pipelines output data to an audio/video (A/V) port 228 for transmission to the display 150. In the illustrated embodiment, the video and audio processing components 220-228 are mounted on the module 214.

A USB host controller 230 and a network interface 232 can also be implemented on the module 214. The USB host controller 230 can be coupled to the CPU 200 and the memory controller 202 via a bus (e.g., a PCI bus), and serves as a host for peripheral controllers 104a-104d. The network interface 232 can provide access to a network (e.g., the Internet, a home network, etc.) and may be any of a wide variety of wire or wireless interface components including an Ethernet card, a modem, a Bluetooth module, a cable modem, and the like.

The game console 102 can include dual controller port subassemblies 240a and 240b, and each subassembly can support two corresponding peripheral controllers 104a-104d. A front panel I/O subassembly 242 supports the functionality of the power button 112 and the eject button 114, as well as any light emitting diodes (LEDs) or other indicators exposed on the outer surface of the game console 102. The subassemblies 240a, 240b, and 242 are coupled to the module 214 via one or more cable assemblies 244.

Eight memory units 140a-140h are illustrated as being connectable to the four controllers 140a-140d in a two memory units per controller configuration. Each memory unit 140 offers additional storage on which games, game parameters, and other data may be stored. When inserted into a controller, the memory unit 140 can be accessed by the memory controller 202. A system power supply module 250 can provide power to the components of the gaming system 100, and a fan 252 can cool the circuitry within the game console 102.

The game console 102 described above can implement a uniform media portal model that provides a consistent user interface and navigation hierarchy to move users through various entertainment areas. The portal model offers a convenient way to access multiple different types of media content including game data, audio data, and video data regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console. Aspects of the UI application and some of the exemplary screen displays it presents are described below in more detail.

The gaming system 100 may be operated as a standalone system by simply connecting the system to the display 150. In the standalone mode, the gaming system 100 allows one or more players operating the controllers 104 to play games and view them on the display 150. With the broadband connectivity made possible via the network interface 232, however, the gaming system 100 can also be operated in a larger, network-based gaming community, as described in detail below.

Figure 3:
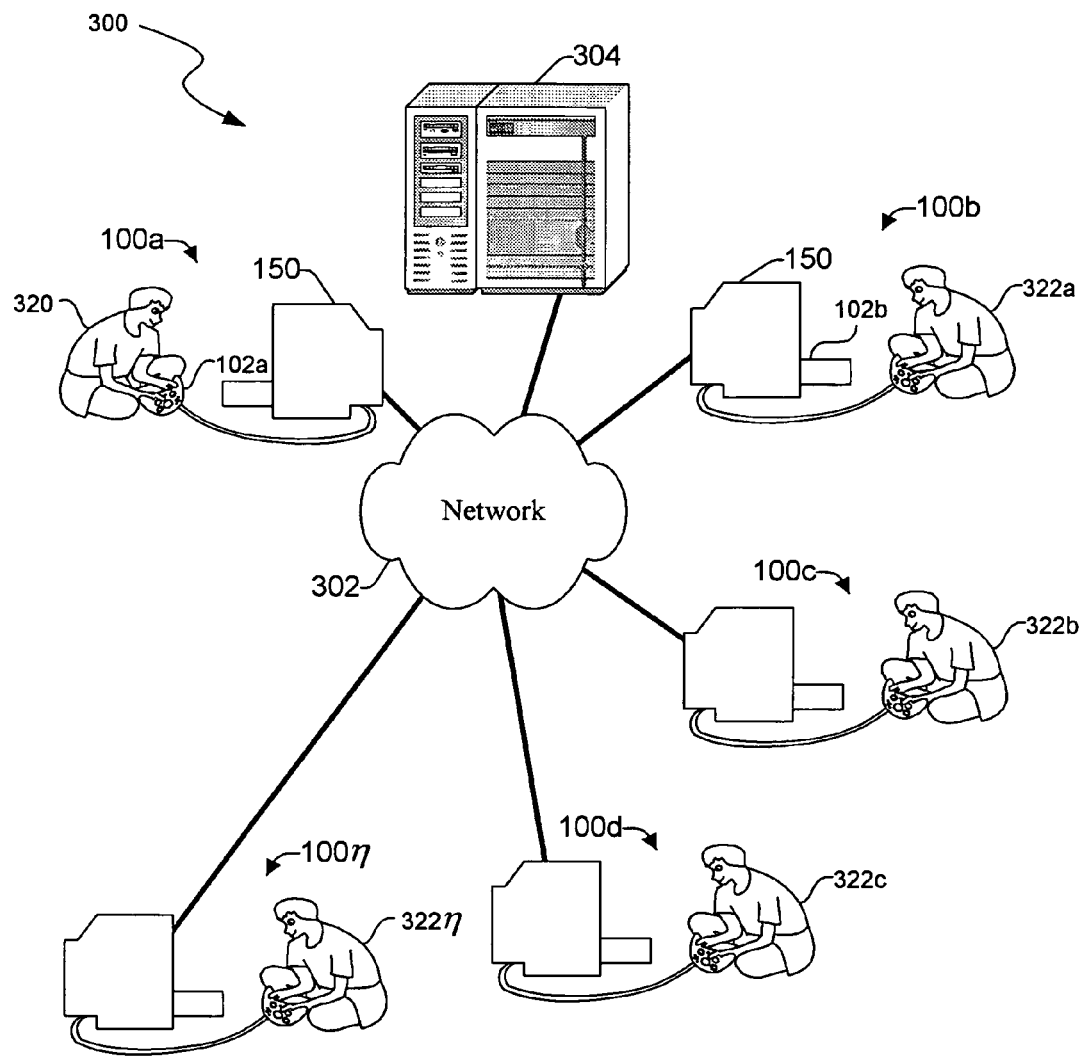
FIG. 3 is a schematic diagram of a gaming environment suitable for implementing various embodiments of the invention.

FIG. 3 is a schematic diagram of a gaming environment 300 suitable for implementing various embodiments of the invention. In the illustrated embodiment, the gaming environment 300 includes a plurality of the gaming systems 100 (identified individually as a host player gaming system 100a and a plurality of gate crasher gaming systems 100b-n) interconnected via a network 302. In one aspect of this embodiment, a host player 320 operates the host player gaming system 100a, while multiple gate crashers 322a-n can operate the gate crasher gaming systems 100b-n, respectively. The network 302 can include one or more communications links such as a point-to-point dial-up connection, a local area network (LAN), an intranet, or the Internet. Each of the gaming systems 100 can also be connected to a server computer 304. As described in greater detail below, the server computer 304 can include a number of facilities for performing aspects of the gate crashing routines described herein. Such facilities can include, for example, processors, memory, server engines, and databases.

One example of single-player mode game gate crashing that can be implemented in the gaming environment 300 in accordance with the present invention is as follows. In this example, the host player 320 is engaged in a single-player mode game on the host player gaming system 100a. In single-player mode, the NPCs in the game are controlled by program-defined AI and/or other routines. During the course of the game, unbeknown to the host player 320, one of the gate crashers 322 (e.g., the gate crasher 322a) breaks into the game via the network 302 and assumes control of one of the NPCs. The NPC can be either a comrade character that aids the main character or an enemy character competing against the main character. At first, the host player 320 may be unaware that the NPC is being controlled by the gate crasher 322a. Further, the host player 320 may not become aware of this until he or she realizes that the NPC is behaving in a manner that is totally different than anything he or she has experienced before. The unpredictability introduced by the gate crasher 322a adds excitement to what might otherwise be a routine and predictable game. As described in greater detail below, the various embodiments of the invention are not limited to a single gate crasher. Accordingly, in other embodiments, additional gate crashers (e.g, gate crashers 322b-n) can assume control of other NPCs.

Additional embodiments of single-player mode game gate crashing are described in greater detail below.

Process Flow on the Host Player Side:

Before or during a single-player mode game, the host player 320 can select an option on the host player gaming system 100a to permit or prohibit gate crashing of his or her game. If the host player 320 elects to permit gate crashing, the information about the host player 320 (e.g., player alias, region, net ranking, etc.) and the game (e.g., difficulty, play stage, etc.) is transmitted to the server computer 304 via the network 302. At the start of play, the host player 320 controls the player character (i.e., the main character). Character information (e.g., position of the main character, parameters such as physical strength, etc.) and stage information (e.g., position of enemy characters, parameters such as physical strength, etc.) are transmitted to the server computer 304 as needed. As described in greater detail below, one or more of the gate crashers 322 can obtain the foregoing information from the server computer 304 and use the information to select the game for gate crashing. Once the gate crasher 322 selects an NPC to control (i.e., an enemy or comrade character), the gate crasher 322 will control that NPC.

Depending on the results of play, the game can progress in a number of ways. For example, if the host player 320 completes the stage, then he or she can progress to the next stage. Similarly, surviving gate crashers 322 can automatically continue controlling their respective enemy/comrade characters in the next stage. If instead the host player 320 is defeated, then he or she can elect to end the game or revive the main character and continue playing.

At the conclusion of the game, the results can be transmitted to the server computer 304. Such results can include, for example, the game score (e.g., number of enemies defeated, points, etc.) and information about the gate crashers 322 that the host player 320 defeated (e.g., gate crasher aliases, the number of gate crashers defeated, etc.). Alternatively, if the host player 320 was defeated, then information about the gate crasher 322 that defeated the host player 320 (e.g., alias, ranking, etc.) can also be transmitted to the server computer 304. Such information can be compiled by the server computer 304 and reflected in the host player's network rankings.

Process Flow on the Gate Crasher's Side:

At any given time, one or more of the gate crashers 322 can select an option on their gate crasher gaming systems 100 indicating that they would like to crash a game. At this time, the corresponding gate crasher gaming system(s) 100 obtain information from the server computer 304 about candidate games/players that are online in the gaming environment 300.

Such information can include, for example, host player information (e.g., alias, region, net ranking, etc.) and game information (e.g., title, stage, etc.) as described above.

There are various methods by which the gate crasher players 322 can use this information to select a game to gate crash. One method, for example, involves randomly selecting a game from the list of host players currently playing the game around the world. Another method involves filtering random candidates based on one or more conditions. Such conditions can include, for example, limiting the candidates to those located in a particular region, those who have completed a particular stage of the game (e.g., to avoid divulgence of gimmicks associated with higher stages), those who have the same/higher/lower net rankings (e.g., selection based on the relative strength of the opponent player), and/or those who are registered on a particular list, such as a "friends" list.

Another method for selecting a game to gate crash involves discretionary selection. This method can include gate crashing a personally selected host player each time. Alternatively, a game can be selected by searching a list of available games according to one or more preset conditions, such as those discussed above with regard to the random selection. Once a gate crasher 322 selects a game to gate crash, a peer-to-peer connection is established between the game console 102b of the gate crasher 322 and the game console 102a of the host player 320.

Once the peer-to-peer connection is established, the gate crasher 322 can select which enemy/comrade character to assume control of in the game world of the host player. At least two methods exist for selecting a gate crashing character. One method involves random selection. In this method, the gate crashing character is randomly selected from among the NPCs that have not been defeated by the main character and are not controlled by other gate crashers. Another method involves discretionary selection. This method can involve selection from a list of available characters based on personal preference or some other criteria, such as map information locating the characters' positions in the game.

The foregoing methods for gate crasher game/player selection are not exhaustive. Accordingly, in other embodiments, other methods can be used to select a game and/or a character to gate crash without departing from the spirit or scope of the present invention. For example, in one other embodiment, the gate crasher 322 can select a character he or she wishes to control first, and then a game in which that particular character is available can be automatically selected and a peer-to-peer connection with the corresponding gaming system can be automatically established.

At the start of gate crash play, the gate crasher 322 controls the enemy/comrade character he or she selected. Depending on the results of play, at least two scenarios are possible. For example, if the gate crasher character 322 is defeated by the host player 320, then in one embodiment, the peer-to-peer connection can be terminated and the gate crasher 322 can find another game to gate crash. Alternatively, the gate crasher 322 may elect to start his or her own single-player mode game and await other gate crasher players. In another embodiment, the gate crasher 322 can be automatically transferred after defeat from one enemy/comrade character to another enemy/comrade character in the same gate crashed game. In this fashion, a single gate crasher 322 can continue to compete with the same host player 320 in serial gate crashing fashion.

Alternatively, if the host player 320 is defeated by the gate crasher 322, then, in one embodiment, the peer-to-peer connection can be terminated and the host player 320 can continue by gate crashing another player's game. Alternatively, the host player 320 can elect to start a new single-player mode game and await other gate crashers. Alternatively, the game can continue in the absence of the host player 320 as the remaining gate crasher players continue to engage each other in competition. As the game proceeds, the host player 320 may elect to revive his or her character and resume play as the main character. Alternatively, the remaining gate crashers 322 can continue to play in the game absent the main character until another gate crasher enters the game to assume control of the main character (and become the new host player).

At the conclusion of the game, the results can be transmitted to the server computer 304. For example, if the gate crasher 322 defeated the host player 320, then information about the defeated host player 320 (e.g., alias, ranking, etc.) can be transmitted to the server computer 304. Such information can be compiled by the server computer 304 and reflected in the gate crasher's network rankings.

The embodiment described above with reference to FIG. 3 includes a single host player 320 for purposes of illustration only. In this embodiment, the host player 320 may be engaged in a single-player mode game on the gaming system 110a prior to having the game gate crashed by one or more of the gate crashers 322. In another embodiment, however, two or more host players 320 can be playing a game in multi-player mode on, for example, the host player gaming system 100a. In this other embodiment, one or more of the gate crashers 322 can crash the multi-player mode game using methods at least generally similar to those described above for a single-player mode game. Accordingly, the present invention is not limited to gate crashing in single-player mode games, but extends to multi-player mode games as well.

Figure 4:
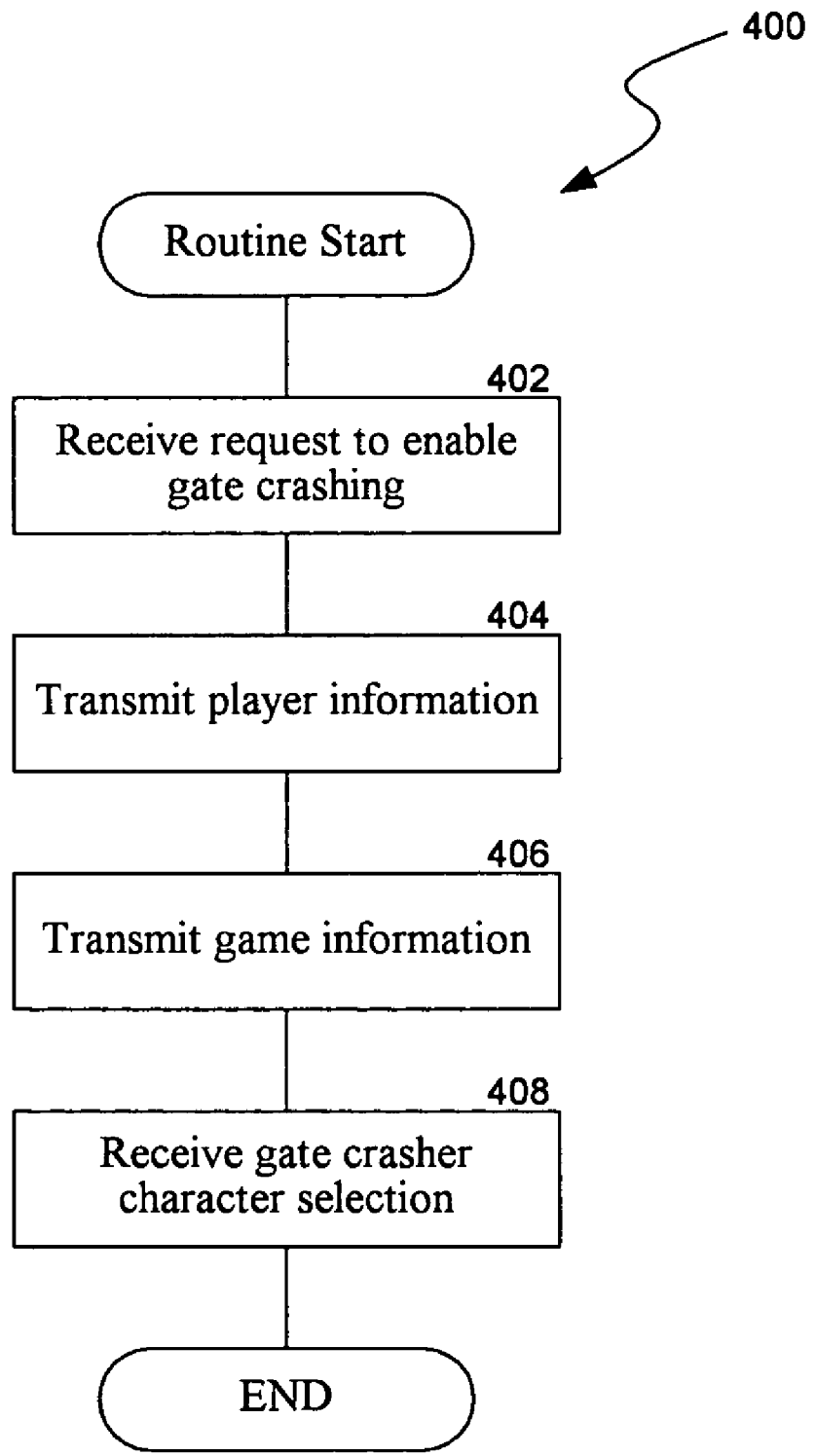
FIG. 4 is a flow diagram illustrating a routine for implementing gate crashing in a single-player mode game in accordance with an embodiment of the invention.

FIG. 4 is a flow diagram illustrating a routine 400 for implementing gate crashing in a single-player mode game in accordance with an embodiment of the invention. In one aspect of this embodiment, all or a portion of the routine 400 can be implemented by the host player gaming system 100a of FIG. 3 (more specifically, the game console 102a) at the start of a game in single-player mode. In block 402, the routine 400 receives a request to enable gate crashing. In one embodiment, this request can come from the host player 320 in the form of a selection made via one or more of the user-interaction mechanisms of the game console 102 (FIGS. 1 and 2). In response to receiving the request from the host player 320, the routine 400 can transmit information about the host player 320 to the server computer 304, as shown in block 404. In addition, the routine 400 can also transmit information about the particular game (e.g., the title, stage, available NPCs, etc.) to the server computer 304, as shown in block 406. As described in greater detail below, one or more of the gate crashers 322 can use this information when selecting the game to gate crash. Further, when one of the gate crashers 322 selects a character with which to gate crash, the routine 400 receives the gate crasher character selection as shown in block 408. After block 408, the routine 400 ends.

Figure 5:
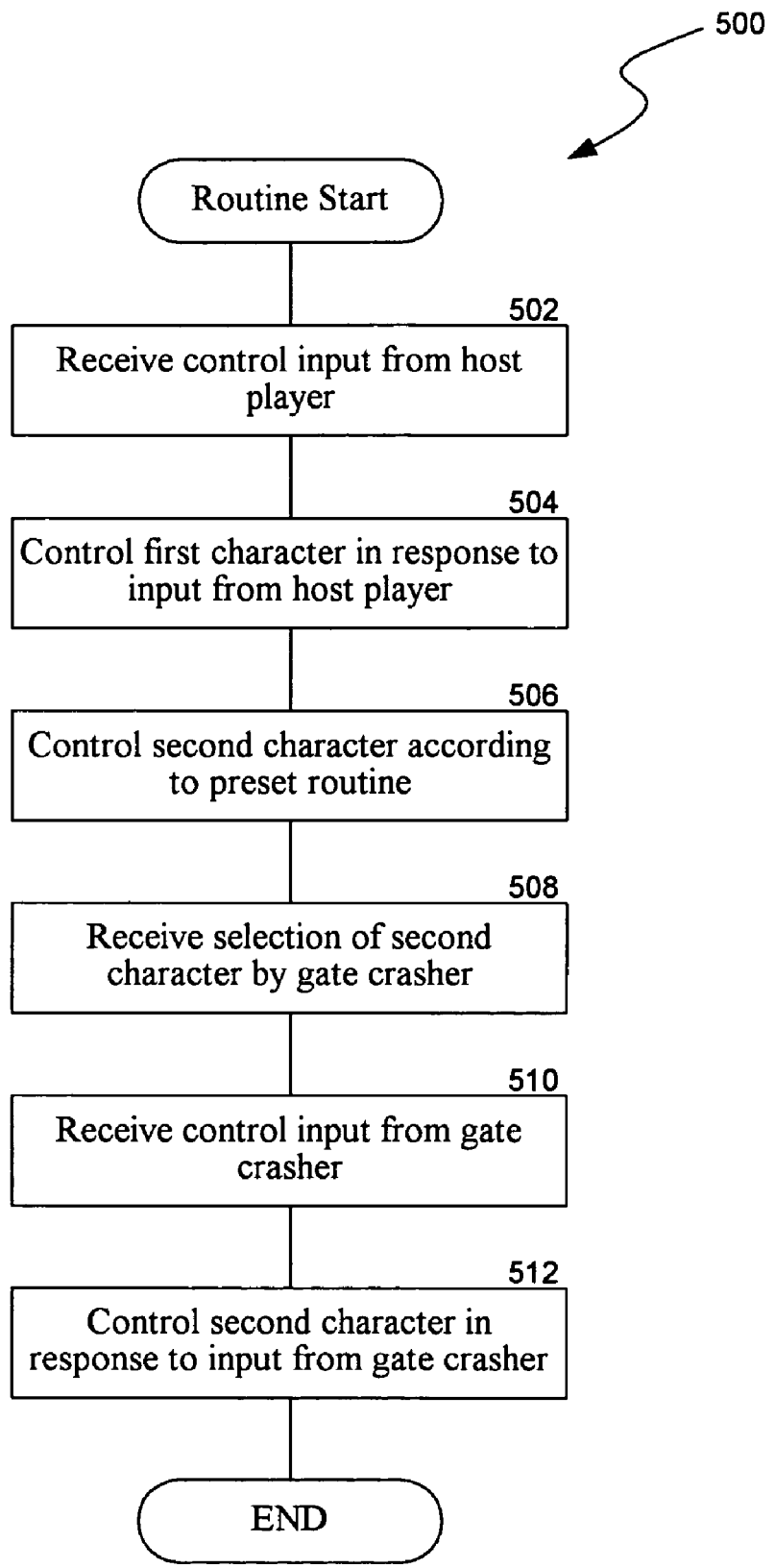
FIG. 5 is a flow diagram illustrating a routine for implementing gate crashing during an ongoing single-player mode game in accordance with an embodiment of the invention.

FIG. 5 is a flow diagram illustrating a routine 500 for implementing gate crashing during an ongoing single-player mode game in accordance with an embodiment of the invention. In one aspect of this embodiment, all or a portion of the routine 500 can be implemented by the host player gaming system 100a of FIG. 3 while the host player 320 is playing a game in single-player mode. In block 502, the routine 500 receives a control input from the host player 320. In block 504, the routine 500 controls a first game character, such as the main character, in response to the control input from the host player 320. In block 506, the routine 500 controls a second character, such as an NPC, according to a preset routine. For example, the NPC may be fighting with the main character in a typical FPS scenario. In block 508, while the game is ongoing, the routine 500 receives a selection from one of the gate crashers 322 wherein the gate crasher 322 assumes control of the NPC. From this point forward, the NPC is controlled by the gate crasher 322, and not by the preset routine. In block 510, for example, the routine 500 receives a control input from the gate crasher 322. In block 512, the routine 500 controls the NPC in response to the control input from the gate crasher. After block 512, the routine 500 ends.

Figure 6:
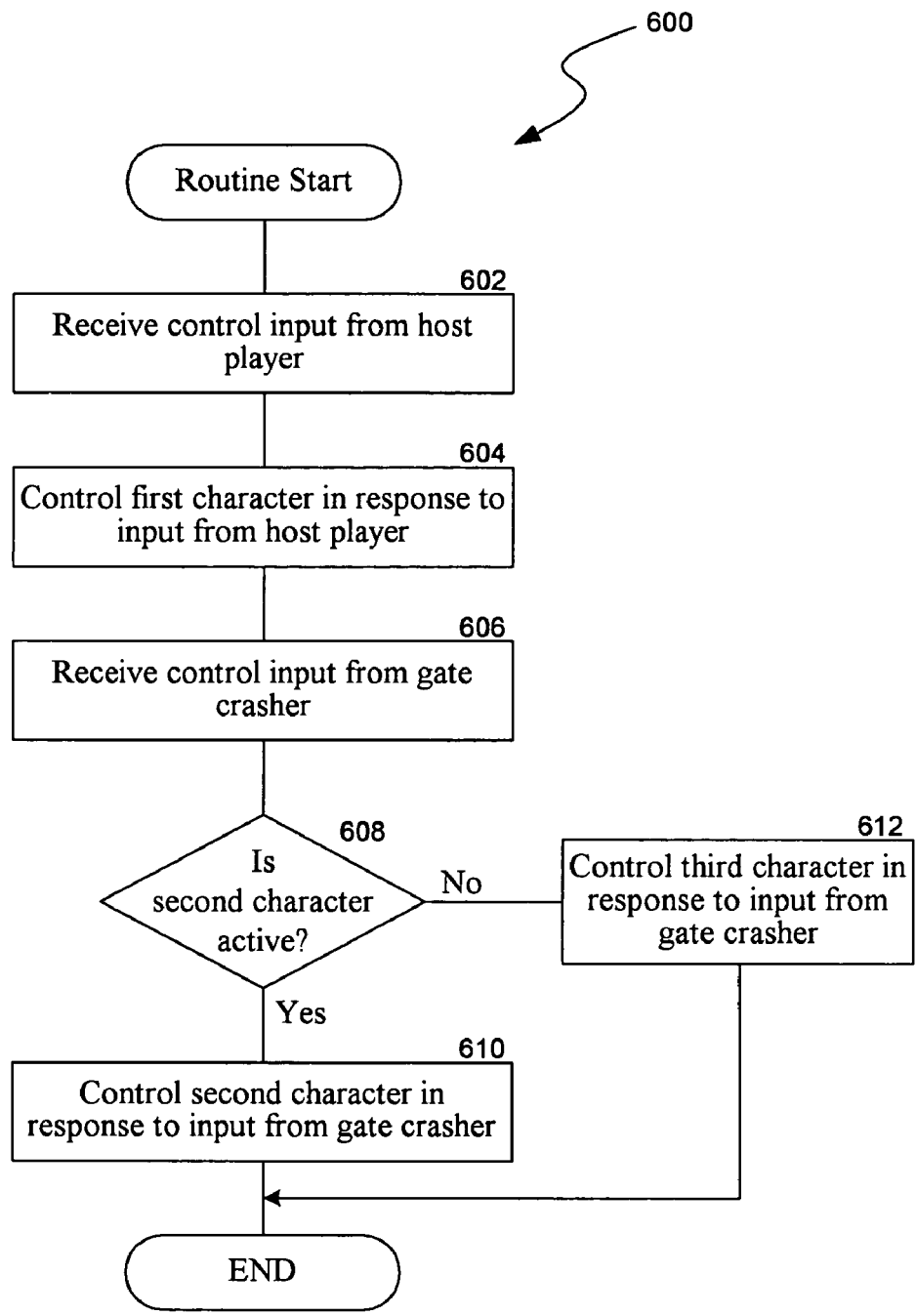
FIG. 6 is a flow diagram illustrating a routine for implementing serial game crashing in accordance with an embodiment of the invention.

FIG. 6 is a flow diagram illustrating a routine 600 for implementing serial gate crashing in accordance with an embodiment of the invention. Like the routines 400 and 500 described above, all or a portion of the routine 600 can be implemented by the host player gaming system 100a of FIG. 3. In block 602, the routine 600 receives a control input from the host player 320. In block 604, the routine 600 controls a first game character, such as the main character, in response to the control input from the host player 320. In block 606, the routine 600 receives a control input from one of the gate crashers 322. The control input is intended to control a second game character, such as a first enemy character. In decision block 608, the routine 600 determines whether the first enemy character is still active or has been defeated by the main character. If the first enemy character is still active, then the routine 600 proceeds to block 610 and controls the first enemy character in response to the input from the gate crasher 322. If the first enemy character is no longer active, then the routine 600 proceeds to block 612 and controls a third game character, such as a second enemy character, in response to the control input from the gate crasher 322. In the foregoing manner, the gate crasher 322 is able to serially control various NPCs as the host player 320 defeats the NPCs. After block 612, the routine 600 ends.

Figure 7:
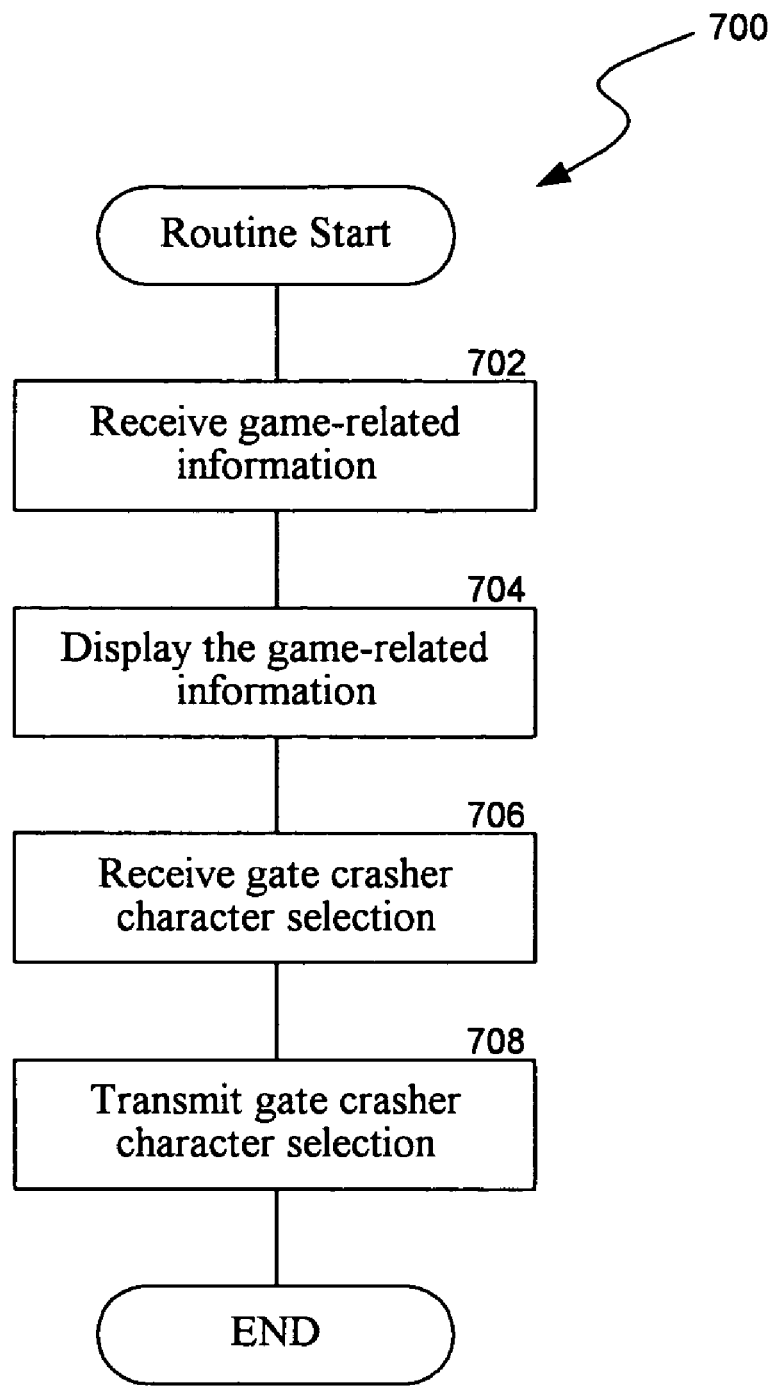
FIG. 7 is a flow diagram illustrating a routine for implementing a gate crasher character selection in accordance with an embodiment of the invention.

FIG. 7 is a flow diagram illustrating a routine 700 for implementing a gate crasher character selection in accordance with an embodiment of the invention. In one aspect of this embodiment, all or a portion of the routine 700 can be implemented by the gate crasher gaming system 100b illustrated in FIG. 3. In block 702, the routine 700 receives information about one or more games being played (or to be played) in single-player mode. Such information can include, for example, host player aliases, the region in which the host player is located, difficulty level of the game, net ranking of the host player, etc. Such information can also include status information about the game such as the particular stage of the game at the present time. In block 704, the routine 700 displays the game information. In block 706, the routine 700 receives a character selection from the gate crasher 322 after the gate crasher 322 has had an opportunity to review the displayed information. In block 708, the routine 700 transmits the gate crasher's character selection to the server computer 304. After block 708, the routine 700 ends.

Figure 8:
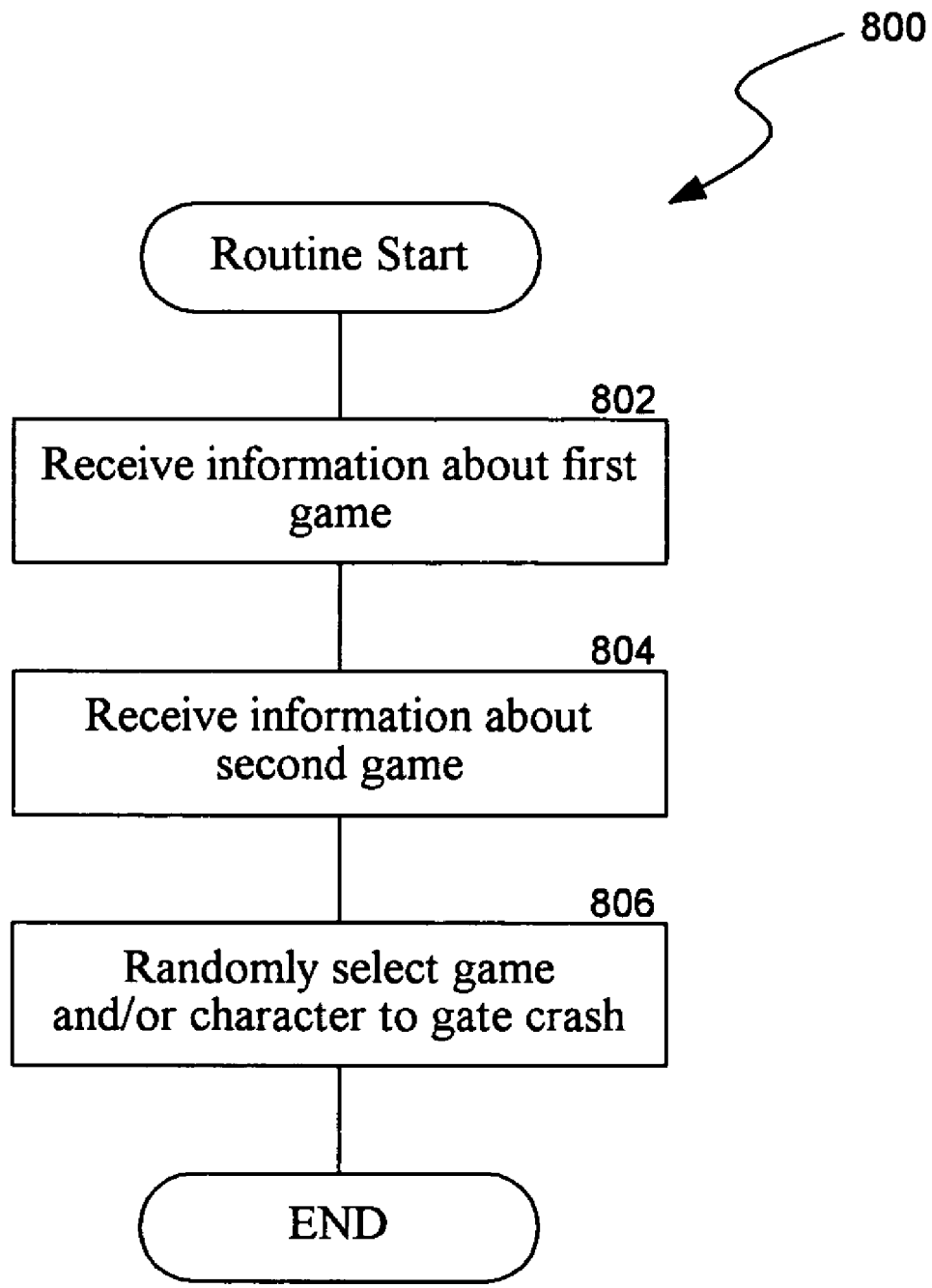
FIG. 8 is a flow diagram illustrating a routine for implementing a gate crasher character selection in accordance with another embodiment of the invention.

FIG. 8 is a flow diagram illustrating a routine 800 for implementing a gate crasher character selection in accordance with another embodiment of the invention. In one aspect of this embodiment, all or a portion of the routine 800 can be implemented by the gate crasher gaming system 100b of FIG. 3. In block 802, the routine 800 receives information about a first game. Such information can include, for example, host player aliases, region, difficulty level, net ranking, play stage, etc. In block 804, the routine 800 can receive similar information about a second game. In block 806, the routine 800 randomly selects a game for the gate crasher 322 to crash and a character for the gate crasher 322 to control. After block 806, the routine 800 ends.

Figure 9:
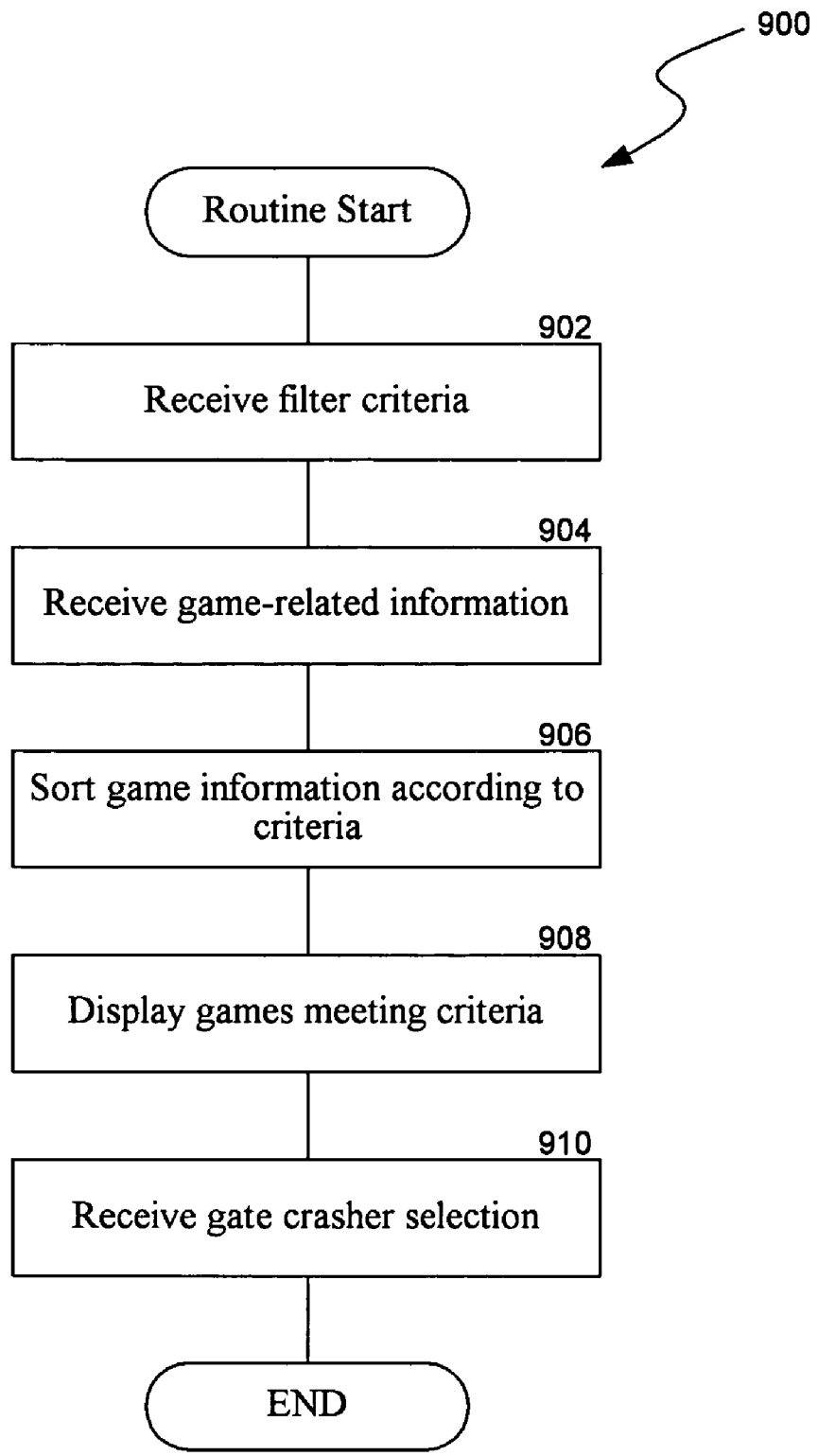
FIG. 9 is a flow diagram illustrating a routine for implementing a gate crasher character selection in accordance with a further embodiment of the invention.

FIG. 9 is a flow diagram illustrating a routine 900 for implementing a gate crasher character selection in accordance with a further embodiment of the invention. Like the routines 700 and 800 described above, all or a portion of the routine 900 can be implemented by the gate crasher gaming system 100b. In block 902, the routine 900 receives selection criteria (i.e., filter criteria) from the gate crasher 322. Such filter criteria can include parameters corresponding to one or more games and/or players the gate crasher 322 wishes to play and/or engage, respectively. For example, such criteria can include player aliases, regions, and net rankings; and game titles, difficulty levels, etc. In block 904, the routine 900 receives game information about ongoing and/or soon to be ongoing games. In block 906, the information is sorted according to the filter criteria received in block 902. In block 908, the routine 900 displays information about one or more games meeting the criteria. In block 910, the routine 900 receives a character selection from the gate crasher 322 corresponding to one of the games. After block 910, the routine 900 ends.

Figure 10:
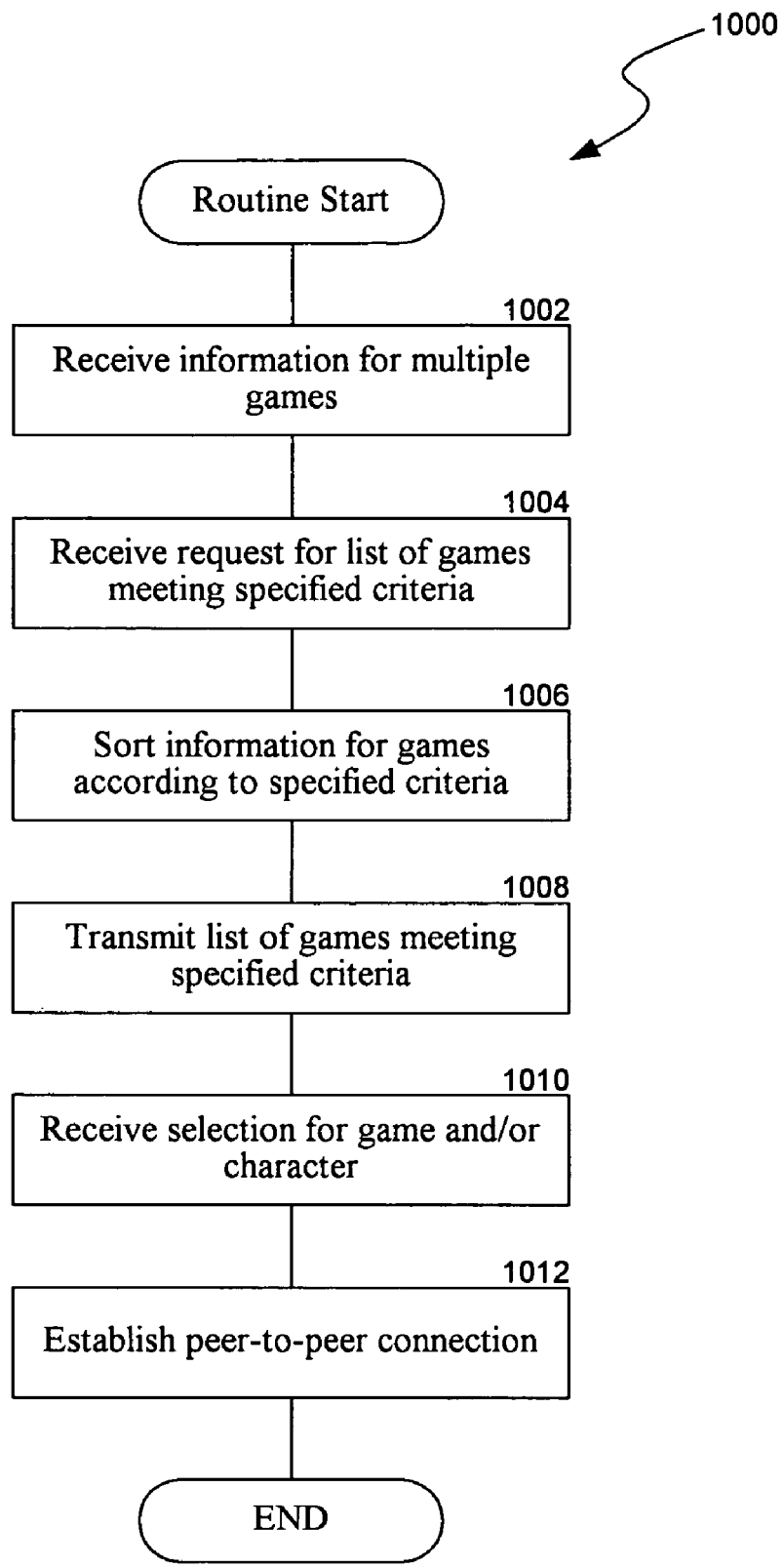
FIG. 10 is a flow diagram illustrating a routine for implementing gate crashing in single-player mode games in accordance with an embodiment of the invention.

FIG. 10 is a flow diagram illustrating a routine 1000 for implementing gate crashing in single-player mode games in accordance with an embodiment of the invention. In one aspect of this embodiment, the routine 1000 can be implemented by the server computer 304 described above with reference to FIG. 3. In block 1002, the routine 1000 receives information for multiple games being played, and/or multiple games soon to be played, in single-player mode. Some of this information may come, for example, from the host player gaming system 100a. In block 1004, the routine 1000 receives a request from, for example, the gate crasher gaming system 100b for a list of games meeting specified criteria. Such criteria may come, for example, from the gate crasher 322a and may be associated with those types of games and/or host players that the gate crasher 322a wishes to engage. In block 1006, the routine 1000 sorts the game information according to the specified criteria in response to receiving the request. In block 1008, the routine 1000 transmits a list of games meeting the specified criteria and/or other information to the gate crasher gaming system 100b. The list of games and/or other information can be displayed on the display 150 of the gate crasher gaming system 100b for viewing by the gate crasher 322a. In block 1010, the routine 1000 receives a selection from the gate crasher 322a for one of the games to participate in and a corresponding character to control. In block 1012, the routine 1000 establishes a peer-to-peer connection between the gate crasher gaming system 100b and the host player gaming system associated with the host game. For example, if the gate crasher 322a selects a character associated with a game being played on the host player gaming system 100a, then the routine 1000 establishes a peer-to-peer connection between the gate crasher gaming system 100b and the host player gaming system 100a. After block 1012, the routine 1000 ends.

Although various portions of the routines 400-1000 have been described above in a particular order, the particular order should not be construed as the only order in which the routines, or portions thereof, can be implemented. In addition, while certain elements of the routines are described herein for purposes of illustration, in other embodiments, other routines consistent with this disclosure can include more or fewer elements. Further, although these routines may be described in the context of a particular component or group of components in the gaming environment 300 of FIG. 3, in other embodiments, the same routines or portions thereof can be performed by other components or other groups of components without departing from the spirit or scope of the present disclosure.

FIG. 11 illustrates a host player screen display 1100 configured in accordance with an embodiment of the invention. In one aspect of this embodiment, the screen display 1100 can be displayed for viewing by the host player 320 on the display 150 of the host player gaming system 100a of FIG. 3. As described in greater detail below, the screen display 1100 can include a number of user-interaction facilities that enable the host player 320 to set the gate crashing parameters for a particular game. For example, in the illustrated embodiment, the screen display 1100 can include one or more gate crasher selection fields 1102. By placing a check in the "yes" field, the host player indicates his or her desire to open the game to gate crashers. Alternatively, a check in the "no" field closes the game to gate crashers. The quantity field allows the host player to indicate how many gate crashers he or she will allow in the game.

The screen display 1100 can also include a plurality of gate crasher attribute fields 1104. The "skill level" field can include a drop-down list that enables the host player to specify the skill level required of potential gate crashers. The "region field" can similarly include a drop-down list that enables the host player to specify one or more regions in which the potential gate crashers must be located. If the host player wants to limit the game to certain gate crashers, then the host player can enter the aliases of those gate crashers in the "aliases" field. The screen display 1100 can also include one or more NPC fields 1106. The NPC fields 1106 allow the host player to specify which of the NPCs can be gate crashed. For example, the host player may decide to let all of the NPCs be gate crashed, or, alternatively, the host player may limit gate crashing to only certain NPCs.

The screen display 1100 can also include other functionalities that allow the host player to further define the parameters of the gate crashing that can take place during a particular game. For example, the host player can indicate whether he or she will allow gate crasher characters to revive after they have been defeated, by selecting a "revival" button 1108. Similarly, the host player can enable serial gate crashing by selecting a "serial" button 1109. After the host player has selected the desired gate crashing parameters, he or she can select a submit button 1110 to initiate a game.

Figure 12:
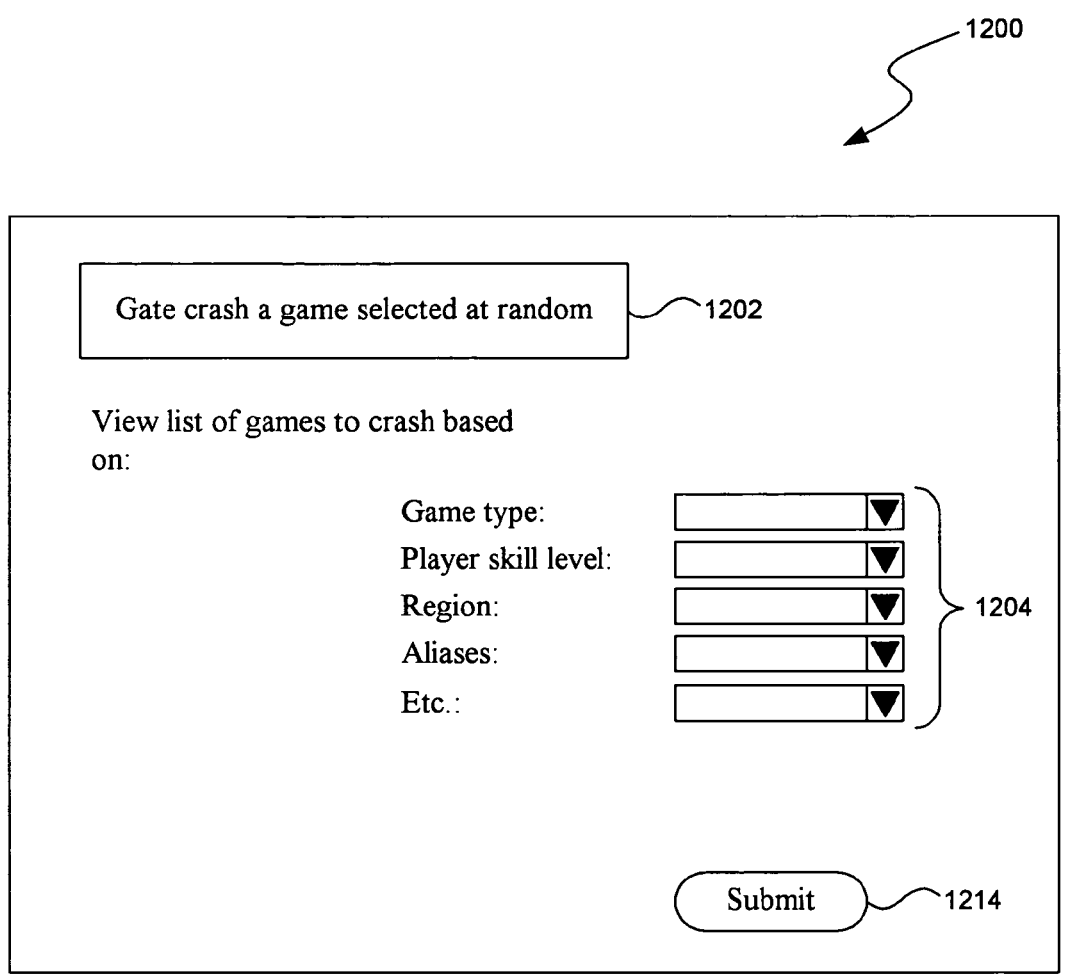
FIG. 12 is a gate crasher screen display configured in accordance with an embodiment of the invention.

FIG. 12 illustrates a gate crasher screen display 1200 configured in accordance with an embodiment of the invention. In one aspect of this embodiment, the screen display 1200 can be displayed for viewing by one or more of the gate crashers 322*a-n* on the display 150 of the corresponding gate crasher gaming system 100*b-n* of FIG. 3. Accordingly, a gate crasher can utilize the screen display 1200 to set the parameters for games he or she wishes to crash. For example, the screen display 1200 can include a random selection button 1202 and a plurality of filter fields 1204. The gate crasher can select the random selection button 1202 if he or she wishes to crash a game selected at random. Alternatively, the gate crasher can use one or more of the filter fields 1204 to select a game based on specific criteria. For example, if the gate crasher desires to crash a particular type or title of game, the gate crasher can select the type or title from a "game type" drop-down list. Further, if the gate crasher desires to crash only games being played by host players of a particular skill level, the gate crasher can indicate this preference using the "skill level" drop-down list. The gate crasher can indicate further preferences using a "region" drop-down list and an "aliases" drop-down list. Once the gate crasher has set the parameters for the game he or she desires to crash, he or she can select a submit button 1214 to request information about, or connection to, a game meeting the parameters.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A computer-implemented method for playing a game, the method comprising:

receiving a request from a first player to enable gate crashing in the game, wherein the game is configured to be played by a single player;

in response to the request from the first player, transmitting information to a remote computer;

in response to transmitting the information to the remote computer, receiving a request from a second player to participate in the game; and in response to the request from the second player to participate in the game, transitioning control of a character in the game from a program routine to the second player, wherein the first player is unaware of a transition of the character's control from the program routine to the second player, and wherein the first player is substantially unaware of which character's control may be transitioned to the second player.

2. The method of claim 1 wherein transmitting information to the remote computer includes transmitting information about the game to the remote computer.

3. The method of claim 1 wherein transmitting information to the remote computer includes transmitting information about the first player to the remote computer.

4. The method of claim 1 wherein receiving a request from a second player to participate in the game includes receiving a non-player character selection from the second player.

5. The method of claim 1 wherein transitioning control of a character in the game from a program routine to the second player includes transitioning control without signaling the first player.

6. A computer-implemented method for playing a game, the method comprising:

receiving a request from a first player to initiate the game, the game suitable to be played by a single player;

receiving a request from the first player to enable gate crashing in the game;

receiving a first control input from the first player;

controlling a first character in response to the first control input received from the first player;

controlling a second character in response to computer-readable instructions;

receiving a request from a second player to control the second character;

in response to the request from the second player, transitioning control of the second character from the computer-readable instructions to the second player, wherein the first player is unaware of a transition of the second character's control from the computer-readable instructions to the second player, and wherein the first player is substantially unaware of which character's control may be transitioned to the second player;

receiving a second control input from the second player; and controlling the second character in response to the second control input received from the second player.

7. The method of claim 6 wherein receiving a first control input from the first player includes receiving a first control input via a first game console operably connected to a first gaming system, and wherein receiving a second control input from the second player includes receiving a second control input via a second game console operably connected to a second gaming system remote from the first gaming system.

8. The method of claim 6 wherein transitioning control of the second character from the computer-readable instructions to the second player includes transitioning control in the absence of notifying the first player.

9. The method of claim 6, further comprising:

receiving a third control input from the second player; and
    if the second character is still active in the game, controlling the second game character in response to the third control input received from the second player; and if the second character is no longer active in the game, controlling a third game character in response to the third control input received from the second player.

10. A computer-implemented method for playing a game, the method comprising:
  receiving information about one or more games from a remote computer, wherein the games are configured to be played by a single player;
  displaying at least a portion of the received information about the games;
  receiving a request to gate crash at least one of the games, wherein a first player has enabled gate crashing in the at least one of the games, wherein the first player is unaware of the request to gate crash the at least one of the games, and wherein the first player is substantially unaware of which character's control may be transitioned to a second player in response to the request to gate crash the at least one of the games; and
  in response to receiving the request to gate crash, transmitting the request to the remote computer.

11. The method of claim 10 wherein receiving information about one or more games from a remote computer includes receiving information about one or more non-player characters participating in the games, and wherein the method further comprises receiving a character selection corresponding to at least one of the one or more non-player characters.

12. The method of claim 10, further comprising sorting the information about the games, and wherein displaying at least a portion of the received information includes displaying at least a portion of the sorted information.

13. The method of claim 10, further comprising in response to transmitting the request to gate crash to the remote computer, implementing a peer-to-peer connection with a remote gaming system.

14. A computer-readable medium having computer-executable instructions for performing steps, wherein the computer-readable medium does not consist of a propagated signal, the steps comprising:
  receiving a request from a first player to enable gate crashing in a game;
  in response to the request from the first player, transmitting information to a remote computer;
  in response to transmitting the information to the remote computer, receiving a request from a second player to participate in the game; and
  in response to the request from the second player to participate in the game, transitioning control of a character in the game from a program routine to the second player, wherein the first player is not aware of a transition of control of the character to the second player, and wherein the first player is substantially unaware of which character may be transitioned to the second player's control.

15. The computer-readable medium of claim 14 wherein transmitting information to the remote computer includes transmitting information about the first player to the remote computer.

16. The computer-readable medium of claim 14 wherein transmitting information to the remote computer includes transmitting information about the game to the remote computer.

17. The computer-readable medium of claim 14 wherein receiving a request from a second player to participate in the game includes receiving a character selection from the second player.

18. The computer-readable of claim 14 wherein the first player controls a first character, and wherein transitioning control of a character in the game from a program routine to the second player includes transitioning control of a second character, and wherein the steps further comprise:
  receiving a first control input from the first player via a first game console operably connected to a first gaming system;
  controlling the first character in response to the first control input received from the first player;
  receiving a second control input from the second player via a second game console operably connected to a second gaming system remote from the first gaming system; and
  controlling the second character in response to the second control input received from the second player.

19. The computer-readable medium of claim 18 wherein the steps further comprise:
  receiving a third control input from the second player; and
    if the second character is still active in the game, controlling the second game character in response to the third control input received from the second player; and
    if the second character is no longer active in the game, controlling a third game character in response to the third control input received from the second player.

20. A computer-readable medium having computer-executable instructions for performing steps, wherein the computer-readable medium does not consist of a propagated signal, the steps comprising:
  receiving information about a game being played on a first gaming system, wherein the game is configured to be played by a single player;
  transmitting the information about the game to a second gaming system remote from the first gaming system;
  receiving a request from the second gaming system to gate crash the game, wherein a first player has enabled gate crashing in the game, wherein the first player is unaware of the request from the second gaming system to gate crash the game, and wherein the first player is substantially unaware of which character may be controlled by the second gaming system in response to the request from the second gaming system to gate crash the game; and
  in response to receiving the request from the second gaming system, establishing a peer-to-peer connection between the first and second gaming systems.

21. The computer-readable medium of claim 20 wherein receiving information about a game includes receiving information about a console-based game.

22. The computer-readable medium of claim 20 wherein receiving information about a game includes receiving information about a console-based game, and wherein receiving a request from the second gaming system to join the console-based game includes receiving a character selection from the second gaming system.

23. The computer-readable medium of claim 20 wherein the steps further comprise:
  transmitting information about the game to a third gaming system;
  receiving a request from the third gaming system to join the game; and
  in response to receiving the request from the third gaming system, establishing a peer-to-peer connection between the first and third gaming systems.

24. A computer-based system for implementing a game, the system comprising:
  means for receiving a request from a first player to allow control of a game character to be transitioned from a program routine to a remote player;

means for transmitting game-related information to a remote computer in response to the request from the first player, wherein the game may be played by a single player; and means for receiving a request from a second player to participate in the game in response to transmitting the information to the remote computer, wherein the first player is substantially unaware of which character the second player may control if the second player does participate in the game.

25. The system of claim 24 wherein the means for receiving a request from a first player include means for receiving a request from a first player to allow control of a game character to be transitioned from a program routine to a remote player during the game without the knowledge of the first player.

26. The system of claim 24 wherein the first player controls a first game character, and wherein the system further comprises means for enabling the second player to control a second character in response to the request from the second player to participate in the game.

27. The system of claim 24 wherein the first player controls a first game character, and wherein the system further comprises means for transitioning control of a second character from a program routine to the second player in response to the request from the second player to participate in the game.

28. The system of claim 24 wherein the means for receiving a request from a second player to participate in the game include means for receiving a character selection from the second player.

29. The system of claim 24, further comprising:
means for receiving a first control input from the first player;
means for controlling a first character in response to the first control input received from the first player;
means for controlling a second character in response to computer-readable instructions;
means for receiving a second control input from the second player; and
means for controlling the second character in response to the second control input received from the second player.

30. The system of claim 24, further comprising means for establishing a peer-to-peer connection between a first gaming system on which the first player is playing and a second gaming system on which the second player is playing.

31. The system of claim 24 wherein the means for transmitting game-related information include means for transmitting information about a console-based game from a first gaming system to a second gaming system.

32. A computer-readable medium coupled to a screen display, wherein the computer readable-medium does not consist of a propagated signal, the screen display comprising:
at least one gate crasher selection field configured to receive an input from a first user, wherein the first user input enables control of at least one character in a related game to be transitioned from a program routine to a second player when the second player requests to control a character, wherein the related game may be played by a single player, and wherein the first user is substantially unaware of which of the at least one characters the second player may control.

33. The computer-readable medium of claim 32 wherein the screen display further comprises:
at least one gate crasher attribute field configured to receive a user input establishing at least one attribute of potential gate crashers in the related game.

34. The computer-readable medium of claim 32 wherein the screen display further comprises:
a gate crasher skill level field configured to receive a user input establishing a skill level of potential gate crashers in the related game.

35. The computer-readable medium of claim 32 wherein the screen display further comprises:
a gate crasher alias field configured to receive a user input identifying an alias of at least one potential gate crasher in the related game.

36. A computer-readable medium coupled to a screen display, wherein the computer-readable medium does not consist of a propagated signal, the screen display comprising:
at least one gate crasher selection field configured to receive a user input, wherein the user input enables the user to assume control of a character being controlled by a program routine in a related game being played on a remote gaming system, wherein the related game may be played by a single player, wherein a first player on the remote gaming system has selected to enable another player to assume control of a character being controlled by a program routine, and wherein the first player is substantially unaware of which character's control will be transitioned to the user.

37. The computer-readable medium of claim 36 wherein the screen display further comprises:
one or more fields configured to receive game filtering criteria.

38. The computer-readable medium of claim 36 wherein the screen display further comprises:
a game type field configured to receive a user input indicating a type of game the user desires to crash.

39. The computer-readable medium of claim 36 wherein the screen display further comprises:
a skill level field configured to receive a user input indicating a skill level of host players with which the user wishes to compete.

40. The computer-readable medium of claim 36 wherein the screen display further comprises:
an alias field configured to receive a user input indicating an alias of a host player with which the user wishes to compete.

* * * * *